Dec. 6, 1949     J. WOJTECH, JR     2,490,184
WHEEL SUPPORT
Filed June 8, 1948
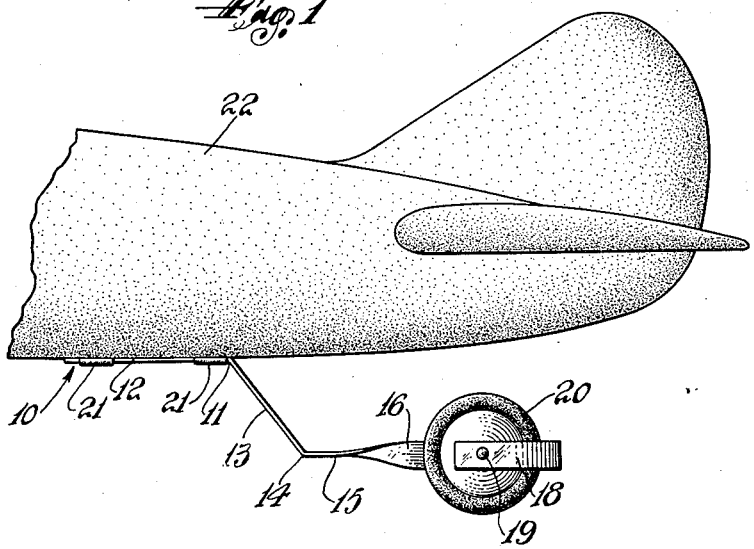
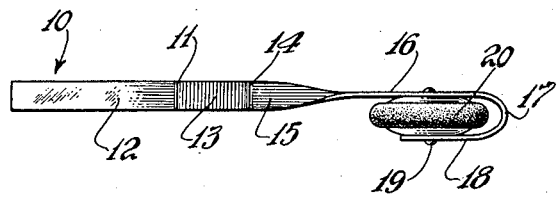
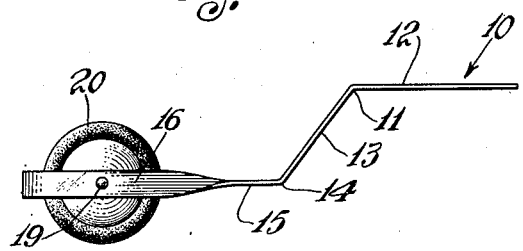
INVENTOR.
Joseph Wojtech, Jr.
BY
Angelo M. Pisarra
ATTORNEY Patented Dec. 6, 1949

2,490,184

UNITED STATES PATENT OFFICE 2,490,184

WHEEL SUPPORT

Joseph Wojtech, Jr., Irvington, N. J.

Application June 8, 1948, Serial No. 31,798

3 Claims. (Cl. 267—41)

This invention relates to supports and more particularly to wheel supports and finds application in a wide variety of different fields. In one of its more specific aspects, the invention is directed to wheel supports for vehicles, such as wheel-barrows, toys and the like.

The primary object of this invention is to provide a wheel support of simple construction and which may be readily manufactured and assembled with the device which is to be supported thereby. It finds especial application in the airplane field and particularly as the tail-wheel thereof and consequently will be described in reference thereto.

The objects and advantages of this invention will be apparent from the following description taken in conjunction with the appended drawing wherein:

Fig. 1 is a fragmentary schematic view showing the tail end of an airplane having my invention coupled therewith.

Fig. 2 is a top plan view of my invention.

Fig. 3 is a side view of my invention.

As shown in the drawings, there is a supporting strip or band 10 preferably composed of a resilient or spring metal. This spring metal band may be flat metal and the width thereof, which may be roughly constant throughout its length, is greater than and generally at least four times the thickness thereof. The length of the band is many times its width. The strip or band 10 is cut to the desired length. Then one end is bent width-wise at 11 to provide an upper portion 12 extending lengthwise forwardly. The bend at 11 may be such that the angle is between about 120°–160° and usually is approximately 135°. The part 13 extending lengthwise downwardly forwardly from upper part 12 is bent width-wise at 14 to provide a part 15 extending lengthwise forwardly and disposed in a plane approximately parallel to the plane of the upper portion 12. The part 15 is twisted to dispose the other end of the band 10 at an angle of approximately 90° to other end 12 of band 10. In this manner the width-wise face of one part of the band 10 is at an angle to 90° to the other part thereof. This end of the band extends lengthwise forwardly to provide part 16, has a width-wise bend 17 and part 18 which extends lengthwise rearwardly and is roughly parallel to the part 16. The parts 16 and 18 have aligned openings therethrough for supporting a pivot or axis 19 carrying a wheel 20 located between the parts 16 and 18.

This wheeled support assembly shown in Figs. 2 and 3 may be readily coupled with any desired device, such as an airplane by inserting the part 12 through bands 21 carried on and anchored to the underside of the rear of the fuselage 22. Of course, any other desired anchoring means may be employed.

I claim:

1. A vehicle wheel support comprising the combination with a wheel and an axis therefor of a single support element, said element comprising an upper part, a bend extending downwardly at an angle to said upper part, a twist near the lower end of said downwardly extending part disposing the width-wise face of the remainder of said element at an angle to the corresponding face of said upper part, said remainder having a bend between the limits thereof disposing one part of the remainder away from another part thereof, said wheel located between said spaced parts of said remainder, said axis carried by said spaced parts of said remainder.

2. A vehicle wheel support comprising the combination with a wheel and a supporting axis therefor of a single spring strip, the width-wise dimension of said strip being materially greater than the thickness thereof, said strip comprising an upper part, a width-wise bend, a part extending downwardly from said bend at an angle to said upper part, a width-wise bend, a part extending from said second bend, a twist disposing the width-wise face of the adjacent part of said strip in a plane at an angle to the plane of the width-wise face of said upper part, said last mentioned portion having a bend disposing of one part in side by side relation to another part thereof, said wheel located in the space between said side by side parts, said axis supported by said side by side parts.

3. A vehicle wheel support comprising the combination with a wheel and a supporting axis therefor of a single spring strip whose width is materially greater than the thickness thereof said strip extending outwardly, a width-wise bend downwardly outwardly, a width-wise bend, outwardly, twisted to dispose the width-wise face of the lower outward part thereof at an angle to the corresponding face of the outwardly extending parts, said so disposed part extending outwardly, bent and the end thereof extending inwardly to provide a space therebetween, said axis carried by said outwardly and inwardly extending parts of said end.

JOSEPH WOJTECH, JR.

No references cited.